United States Patent [19]

Shu

[11] Patent Number: 5,594,839
[45] Date of Patent: Jan. 14, 1997

[54] APPARATUS AND METHOD FOR IMPROVING BLACK AND COLOR SEPARATION IN HALFTONED IMAGES BY PRINTING BLACK DOTS IN A DIFFERENT SCREEN PHASE

[75] Inventor: Joseph S. Shu, San Jose, Calif.

[73] Assignee: Seiko Epson Corporation, Tokyo, Japan

[21] Appl. No.: 323,762

[22] Filed: Oct. 17, 1994

[51] Int. Cl.$^6$ ................................................. H04N 1/52
[52] U.S. Cl. .......................................... 395/109; 358/536
[58] Field of Search ............................ 395/109; 358/536, 358/534, 535, 456, 457, 460, 458, 298; 382/237

[56] References Cited

U.S. PATENT DOCUMENTS

| | | | |
|---|---|---|---|
| 4,752,822 | 6/1988 | Kawamura | 358/457 |
| 4,774,567 | 9/1988 | Stansfield et al. | |
| 4,955,065 | 9/1990 | Ulichney . | |
| 4,974,067 | 11/1990 | Suzuki et al. | 358/534 |
| 5,055,942 | 10/1991 | Levien | 358/456 |
| 5,155,599 | 10/1992 | Delabastita | 358/298 |
| 5,172,248 | 12/1992 | Urabe et al. | 358/456 |
| 5,285,291 | 2/1994 | Schiller | 358/456 |
| 5,305,118 | 4/1994 | Schiller et al. | 358/456 |

OTHER PUBLICATIONS

*Angling for Color*, B. Fraser, *Publish* Jun. (1991) pp. 74–82.
Society for Information Display Intern. Symposium Digest of Technical Papers vol. XXV, San Jose, CA, Jun. 14–16, (1994); *Adaptive Error Diffusion for Multiresolution Rendering*, P. W. Wong, pp. 801–804.

Society for Information Display Intern. Symposium Digest of Technical Papers vol. XXV, San Jose, CA, Jun. 14–16, (1994); *An Efficient Implementation for Stochastic DBS*, T. J. Flohr et al. pp. 797–800.

Society for Information Display Intern. Symposium Digest of Technical Papers vol. XXV, San Jose, CA, Jun. 14–16, (1994); *The Blue–Noise Mask and Its Comparison with Error Diffusion in Color Halftoning*, M. Yao et al., pp. 805–808.

*Primary Examiner*—Scott A. Rogers
*Attorney, Agent, or Firm*—Eric B. Janofsky

[57] ABSTRACT

A K separation screen comprises a grid of dots located at fixed positions, with the screen angle for each color, including black, maintained at 45°. All of the primary color dots are printed at a predetermined screen frequency at predetermined locations. The black dots are also printed at a fixed screen frequency at predetermined locations. However, the black dots are printed in a different screen phase from the other colors, in particular, the phase offset is equal to one-half the screen frequency. Apparatus and a method are disclosed for generating the K separation screen using a cluster dot dithering array and offsetting the array pattern used to generate the colored halftone dots from the array pattern used to generate the black halftone dots.

25 Claims, 4 Drawing Sheets

APPARATUS AND METHOD FOR IMPROVING BLACK AND COLOR SEPARATION IN HALFTONED IMAGES BY PRINTING BLACK DOTS IN A DIFFERENT SCREEN PHASE

BACKGROUND OF THE INVENTION

1. Field of the Invention

The present invention relates to digital printing devices, and, in particular, to methods and apparatus for generating black, or K, separation screens for use in halftoning operations that convert a color input to a binary output suitable for printing.

2. Description of the Related Art

Most computer-driven printing devices which generate hard copy, such as laser, dot-matrix and ink-jet printers, print in a binary fashion—the output medium is divided into an array of picture elements or "pixels" and the devices can either print a small colored dot at each pixel location or leave the pixel location blank. In the case of monochrome printers, all of the dots are printed with a single color whereas with color printers a dot color is chosen from a small set of colors. In any case, the dot itself has a uniform color so that the resulting output consists of an array of colored and blank pixels.

Pictorial images such as those produced by photographic techniques or by computerized imaging systems, by contrast, are continuous in tonality. If a monochrome image is divided into pixels, each pixel exhibits a "grayscale" color whose tonal value falls within a range of tonal values. Similarly, if a color image is divided into pixels, each pixel exhibits a hue and an intensity both of which fall in ranges. In order to reproduce such "continuous-tone" images by means of electronic printing, the images must therefore be converted into a form which is suited to the characteristics of the printing device, generally a binary format. This conversion process, which may take many forms, is generically referred to as "halftoning." Although a halftone image actually consists solely of a spatial pattern of binary pixels (colored or blank dots), the human visual system integrates this pattern to create an illusion of a continuous-tone image.

During the printing process, the image to be printed is divided into a series of pixels and the value of the image in each pixel is quantized to produce a multi-bit digital word which represents the tonal value of the pixel. The image is thus converted to a stream of digital words which are provided to the printing device. In order to convert the format of each word into a format suitable for reproduction on the digital device, halftoning is performed on the digital word stream during a process called preprocessing. Numerous halftoning techniques have been developed and refined over the years. In their simplest form, such techniques compare the value of each digital word with a threshold level, and generate a binary output pixel value depending on the relative values.

For example, a digital scanner processing a continuous-tone monochrome image might generate a stream of multi-bit words representing the detected light intensities. Commonly, the numerical value of these words ranges from 0 to 255, corresponding to a 256-level gray scale or an eight-bit word. If such a digital word stream is to be reproduced on a binary printing device, the halftoning process compares the scanner output words with a either a single threshold value or an array of threshold values to produce the required binary output pixel stream. In such a system, each 8-bit scanner word has effectively been compressed into a single-bit output word.

Color images are typically processed by separating each color into one or more color components or "primaries" whose superposition generates the desired color. Generally, three primary colors (either the conventional "additive" primary colors—red, green and blue or the conventional "subtractive" primary colors—cyan, magenta and yellow) are used. A digital scanner processing a continuous-tone color image might generate a stream of multi-bit words for each of the three color components (usually the additive primary colors). Commonly, the numerical value of these words also ranges from 0 to 255, corresponding to 256 intensity levels or an eight-bit word. Thus, each colored pixel is represented by 3 eight-bit words or 24 bits total.

The digital word stream corresponding to a colored image is halftoned by comparing the eight-bit word for each color component with a threshold value in the same manner as monochrome processing. The color components are processed separately so that the three 8-bit scanner words are compressed into a three-bit output word which is eventually printed as three dots—each dot being printed in one of the primary colors.

Theoretically, it is possible to reproduce the full range of printable colors using varying intensities of the three primary colors and superimposing the three dots. For example, if the maximum intensity of each color is printed and the three dots are superimposed, the resulting dot should appear as black. In practice, however, superimposing or overprinting 100% of each primary color produces a gray-brown colored dot and completely saturates the paper with ink so generally black is added as a fourth color. Thus, the colors used are red, green, blue and black (RGBK) or cyan, magenta, yellow and black (CMYK).

In reproducing graphic images with traditional printing presses, the halftoning operation is performed by photographing an image through a halftone screen. A halftone screen is a grid defined by two patterns of regularly-spaced parallel opaque lines which cross at 90° angles. The crossed lines form rows of square "holes" in the screen. The spacing of the lines on the halftone screen, measured in lines per inch, is known as the screen "frequency."

Although the screen frequency is constant, during the photographic process, the holes in the screen act like pinhole lenses producing dots on the photographic negative whose size is proportional to the amount of light reflected from the original image. Consequently, relatively light areas of the image produce larger black areas on the negative than darker areas. When the negative is reproduced as a positive the larger dark areas translate into smaller dots. The viewer's eye perceives the dot patterns as gray areas.

When such printing presses are used to print a color image, color "separations" of the image are made by photographing the original image four separate times through the same halftone screen but with a different color filter for each primary color and black. The result is four separate halftone dot patterns. However, if the dot patterns are simply superimposed on printing, the dots where three dot colors overprint result in color distortions. In addition, it is generally impossible to obtain perfect registration or alignment of the dot patterns on a conventional printing press and, if the dots do not overprint exactly, additional color distortions arise Consequently, in order to avoid color distortions in traditional printing arrangements, the dots from the patterns are not overprinted, but are instead printed in close proximity so that the viewer's eye integrates the dots to provide the shades of color in the original image.

More specifically, each halftone screen corresponding to a particular color is rotated relative to the position of the other screens causing the resulting dot patterns to be rotated at different angles. In accordance with conventional terminology, the direction of printing is called the printing or pixel grid "direction." The halftone dots of each color all lie along a screen direction which, when the pattern is rotated, forms an angle with the printing direction called a screen "angle." When four color printing is used, each color is printed in different screen angle and a conventional printing pattern separates the screen angles by 30° in order to produce the best looking halftoned image.

Since, as previously mentioned, the screens consist of lines running at 90° angles, there is room for only three 30° rotations before the one of the patterns overprints another, thus, in four color printing, one color is printed at a "odd" angle relative to the 30° spacing. The traditional screen angles for CMYK printing are 45° for black, 75° (45°+30°) for magenta, 105° (75°+30°) for cyan and 90° for yellow. The darkest color (black) is printed at a 45° angle because dot patterns printed at 45° have been found to produce the least noticeable artifacts, whereas yellow, the color that is printed at the odd angle of 90°, is the lightest color and has been found to be the least likely to make visible artifact patterns. The result of the screen angle differences is a circular "rosette" pattern of color dots that provides the illusion of full color images when viewed at a distance from the paper.

The problem with using the conventional screen angles is that slight variations in the exact angles produce geometrical artifact patterns called moiré patterns. As the screen angles differ more and more from the theoretical values, the moiré patterns become more visible and eventually overwhelm the image.

The moiré pattern problem is especially acute on digital images produced by "raster" devices, such as printers or digital imagesetters, which devices can only print a fixed pattern of dots of equal size. For example, a typical printer cannot vary either the size or position of each pixel, all it can do is print one or more dots at a predetermined grid location or leave the location blank. Thus, the only halftone dot spacings (1/(dot spacing) along the screen direction is called the screen frequency) that are possible on such a device are those that divide evenly into the device resolution, since the device cannot print part of a pixel.

These digital devices can simulate traditional halftone dots by grouping the pixels into patterns of halftone "cells" where each cell corresponds to a single halftone dot. However, the above-mentioned moiré pattern problem occurs when the halftone cells are rotated to produce color separations, since the corners of the halftone cell must fall in the pixel grid. Thus, when the traditional screen rotation approach is used, there are a limited number of angles available for rotating the halftone cells and these angles may be close, but are not equal to, the theoretical angles.

Further, the traditional screen rotation approach does not address another problem which occurs in some high-resolution desktop printers in which the dots are oversized. For example, in a printer which has a resolution of 720 dpi (dots per inch), it is desirable that the dot diameter be slightly greater than the dimension of a square pixel grid so that the dots slightly overlap when printed adjacent to each other. However, many such printers actually print dots which are considerably larger than the desired dot size. In these latter printers, if a black dot is printed adjacent to a colored dot, the black dot (which is essentially opaque) overprints the colored dot. This overprinting causes the entire image to appear darker than the corresponding original image.

In order to reduce the visibility of the moiré patterns, a different type of screen was developed by Marcel Coderch of Anaya Systems and is known as a "Flamenco" screen. In the Flamenco screen, rather than rotating the color screens relative to each other, all color dots are located on a fixed grid with optimal spacing of the dot centers. The screen angle for each color (including black is 45°). In order to separate the dots, the color screens are offset slightly from one another in the horizontal and vertical directions causing the dots to form a repeating square pattern with a different color dot located on each corner of the square pattern.

The Flamenco screen also reduces the overprinting problem caused by excessive dot overlap because, in the Flamenco pattern, the black dots are physically separated from the other colored dots and, thus, the halftoned colors retain much of their original brightness even in cases of severe dot overlap.

Accordingly, it is an object of the present invention to provide a separation screen pattern which effectively separates the black dots from the color dots.

It is another object of the present invention to produce a separation screen pattern which does not require precise angular adjustments to separate the black and colored dots.

It is a further object of the present invention to produce a separation screen which can be used with a raster device.

It is yet another object of the present invention to produce a separation screen which can be quickly and economically generated using standard techniques.

DESCRIPTION OF THE INVENTION

Summary of the Invention

The foregoing objects are achieved and the foregoing problems are solved in one illustrative embodiment of the invention in which a screen (called a black or K separation screen) comprises a grid of dots located at fixed positions, with the screen angle for each color, including black, maintained at 45°. All of the primary color dots are printed at a predetermined screen frequency at predetermined locations. The black dots are also printed at a fixed screen frequency at predetermined locations. However, the black dots are printed in a different screen phase from the other colors, in particular, the phase offset is equal to one-half the screen frequency.

Consequently, the screen has a plurality of printing positions which fall into two groups: a first group including positions which can be left blank or at which a colored dot can be printed and a second group including positions which can be left blank or at which a black dot can be printed.

The overprinting capabilities of a conventional inkjet printer are used to print up to two primary color dots at each color printing position and, thus, one of eight colors can be printed in each color printing position. These colors include white (for which there is no printing), a single primary color dot and a superposition consisting of two of the primary colors. Black is always printed alone at a second position.

The resulting screen produces a black separation which is as good as the Flamenco screen, but the inventive screen pattern can easily be generated on a raster printer by using a conventional dithering matrix and cluster-dot dithering techniques. In particular, a single dither matrix can be used for both the black and colored dots. The matrix is shifted a distance equal to one-half of the inverse of the screen frequency when black dots are printed. The shift essentially reduces the possibility of printing black and color at the same printing position.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
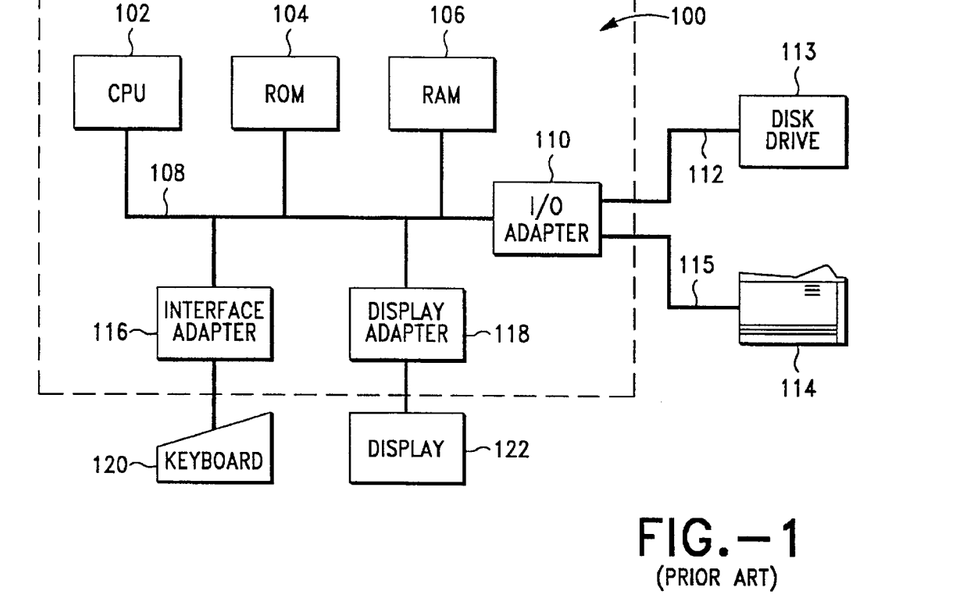
FIG. 1 is a block schematic diagram of a computer system, for example, a personal computer system on which a halftoning operation using a K separation screen created with the inventive method and apparatus can operate.

The invention is preferably practiced in the context of an operating system which is resident on a personal computer such as the IBM®, PS/2® or Apple® Macintosh® computer. A representative hardware environment is depicted in FIG. 1, which illustrates a typical hardware configuration of a computer 100 in accordance with the subject invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122 such as a video monitor. The workstation has resident thereon and is controlled and coordinated by operating system.

A computer system such as that shown in FIG. 1 generally includes a printing device which is electrically connected to the computer system and controlled by it in order to generate a permanent image on a selected medium. In order to print a document which is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include a preprocessing step in which a graphical display is converted into the form used by the printing device by the halftoning operations discussed above.

The pagination and reformatting necessary to convert the printable information into a form which can be printed a given printing device can be performed by specialized hardware, but are generally performed by software programs running within the computer system. The pagination is performed by either an application program which generated the initial output or by an operating system which is a collection of utility programs that perform basic file manipulation functions. The reformatting, including the halftoning operations, are specific to the printing device and are usually contained in a software program called a "driver" which may be part of the operating system, but must be specifically associated with a particular printing device. The driver program receives textual and image information from the computer system and performs the processing as described above to generate signals that can directly control the printing device.

Figure 2:
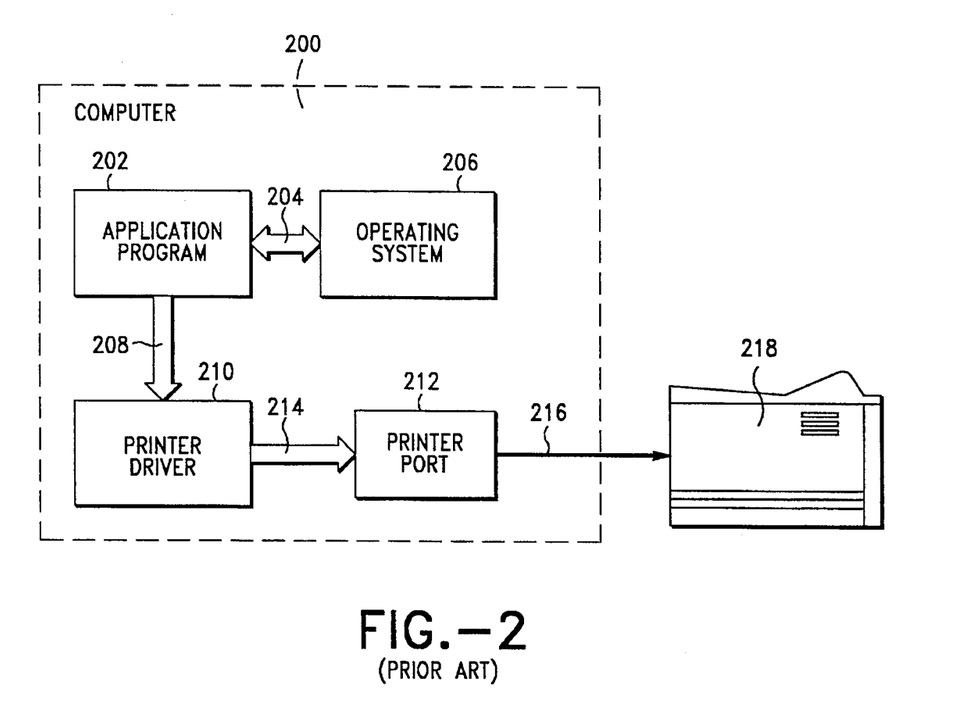
FIG. 2 is a schematic block diagram of a prior art computer system showing the relationship of an application program, an operating system and a printer driver in which the halftoning operation is performed.

For example, FIG. 2 is a schematic illustration of a typical computer system utilizing an application program, an operating system and a printer driver. The computer system is schematically represented by dotted box 200, the application program is represented by box 202 and the operating system by box 206. The interaction between the application program 202 and the operating system 206 is illustrated schematically by arrow 204. This dual program system is used on many types of computers systems ranging from mainframes to personal computers.

The method for handling printing, however, varies from computer to computer, and, in this regard, FIG. 2 represents a typical prior art personal computer system. In order to provide printing functions, the application program 202 interacts (as shown schematically by arrow 208) with printer driver software 210. The printer driver software 210 generally performs halftoning operations and may perform other operations to produce a reformatted information stream containing embedded commands and converted graphical information as shown schematically as arrow 214. The converted information stream is, in turn, applied to a printer port 212 which contains circuitry that converts the incoming information stream into electrical signals. The signals are, in turn, sent over a cable 216 to the printer 218. Printer 218 usually contains an "imaging engine" which is a hardware device or a ROM-programmed computer which takes the incoming information stream and converts it into the electrical signals necessary to drive the actual printing elements. The result is a "hard copy" output on the selected medium.

Figure 3:
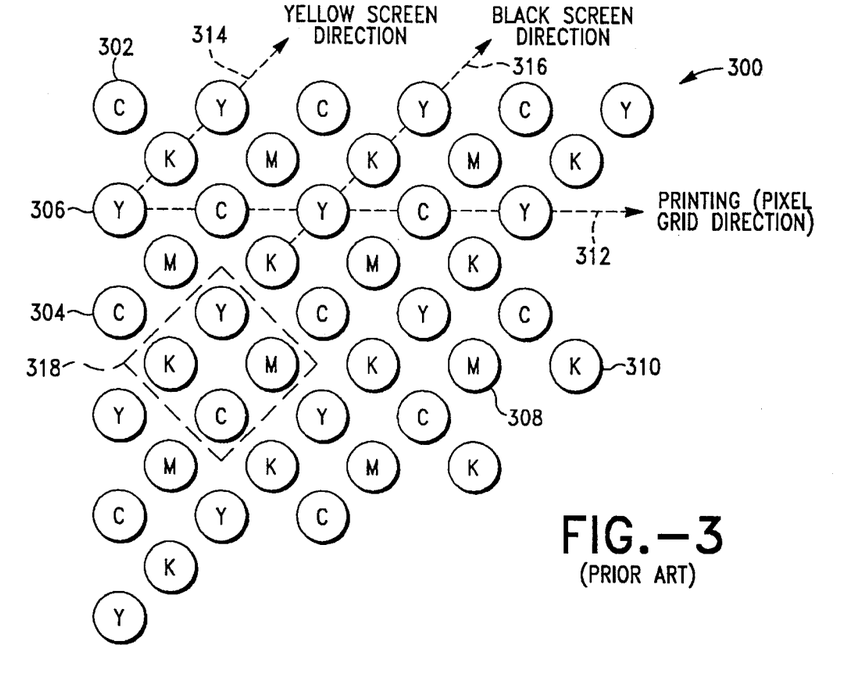
FIG. 3 is an illustrative section of a prior art Flamenco screen illustrating the positions of the colored and black dots.

FIG. 3 illustrates a portion 300 of a prior art Flamenco screen pattern which shows the printing positions of each of the colored and black dots. For example, halftone dot position 302 indicates a position at which a cyan halftone colored dot can be printed. Position 302 can be either left blank (no printing) to produce a "white" dot or a cyan dot with variable size can be printed. Other colors can be printed in position 302, but with a lower probability. Other cyan halftone dot positions are indicated as circles with a capital "C" inside (such as dot position 304).

Similarly, halftone dot position 306 is a position in which yellow pixels can be printed, other yellow halftone dot positions are shown as circles with a "Y" inside.

Those circles, such as circle 308, with a "M" inside indicate halftone dot positions which can be printed with the magenta primary color. Finally, dot positions comprising a circle with a "K" inside (such as position 310) are halftone dot positions which can be printed with black pixels.

Using conventional terminology, the pixel grid direction for this prior art Flamenco screen is shown by dotted arrow 312. In accordance with the Flamenco pattern, and as shown in FIG. 3, each halftone dot printing position is physically fixed as part of a grid pattern at the optimal dot spacing. The screen angle for each color is 45° (for example, as shown by dotted arrow 314, the yellow screen angle is 45° as is the black screen angle shown by arrow 316). The four colors are offset both horizontally and vertically from each other such that the dots form a small square pattern where each of the square corners comprises a different color. Such a square pattern is shown within the dotted square 318.

As can be seen in FIG. 3, the prior art Flamenco screen separates each of the primary colors as well as the black color since each halftone dot printing position accepts mainly single color halftone dots.

Figure 4:
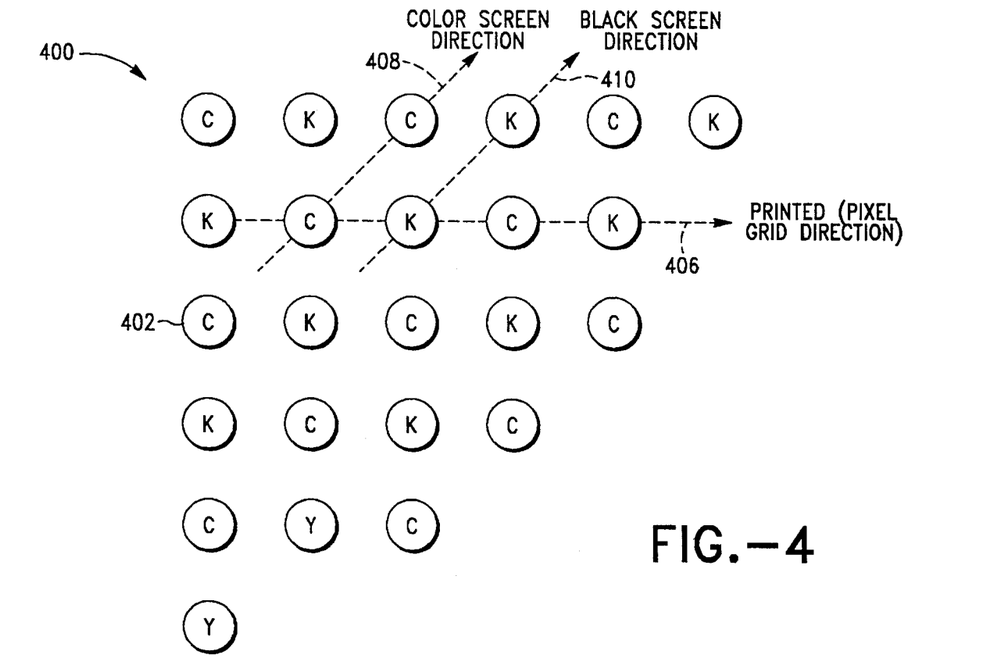
FIG. 4 is an illustrative section of a inventive K separation screen illustrating the positions of the colored and black dots.

A portion 400 of a K separation screen constructed in accordance with the principles of the present invention is shown in FIG. 4. The inventive screen has similarities to prior art Flamenco screen in that all of the halftone dot printing positions are arranged on a rectangular grid pattern with the dot spacing being fixed at an optimal spacing. However, in contrast to the Flamenco screen, the inventive screen pattern has only two position types: position type 1 indicated by a circle with a "K" (such as circle 402) in which the only printing choice is to print a black halftone dot or leave the position blank, and position type 2 indicated as a circle with a "C" (such as circle 404) in which one of the three primary colors or superposition of two of the primary colors are printed.

Assuming a printer which can print cyan, magenta, yellow and black (CMYK) and can overprint two primary colors, the following colors can be printed (a "1" indicates that the primary color is printed and a "0" indicates that the color is not printed):

| C | M | Y | Color | Print position |
|---|---|---|-------|----------------|
| 0 | 0 | 0 | white | no printing |
| 0 | 0 | 0 | cyan | |
| 0 | 1 | 0 | magenta | |
| 0 | 0 | 1 | yellow | |
| 0 | 0 | 1 | green | print at position 2 |
| 0 | 1 | 1 | red | |
| 1 | 1 | 0 | blue | |
| 1 | 1 | 1 | black | print at position 1 |

The printing or pixel grid direction is shown by dotted arrow 406, the screen direction of the colored (one or primary colors) dots is shown by dotted arrow 408 and the screen direction of the black dots shown by dotted arrow 410. As with the prior art Flamenco screen, both of these screen angles for color and black is are 45°. The positions of the halftone dot printing patterns cause the black halftone dots to be widely dispersed among the colored halftone dots thereby reducing the probability of a black dot overprinting a colored dot even if the dots are substantially oversized. The inventive screen generates equivalent color separation properties to the prior art Flamenco screen to achieve high quality halftone images on color printers.

The inventive K separation screen can be implemented a conventional ordered dithering technique called "clustered dot dithering" in which an array of predetermined, generally different, threshold values (called a dither array) with the same spacing as the image pixels is conceptually overlaid onto the pixel array. The dither array is generally smaller than the image array so that, during the processing, the dither array is repeated side by side or "tiled" over the image array to produce a repetitive pattern called halftones. Each image pixel thus conceptually has two values associated with it—the actual pixel tonal value and the threshold value of the overlaid dither array. Equivalently, the values in the dither array can be added to the image value of each pixel prior to a comparison with a fixed threshold.

Each pixel is then processed by comparing its tonal value to the associated dither array value (or the augmented pixel value is compared to a fixed threshold) and a single bit output value is generated based on the comparison. For color processing, each of the primary colors and black is processed separately to generate a four bit output.

Figure 5:
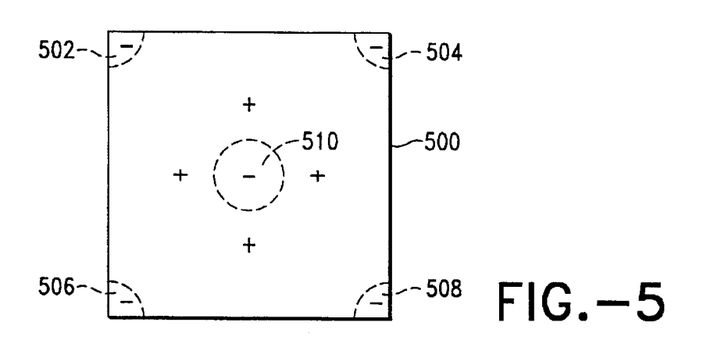
FIG. 5 illustrates the general configuration of a dither array used with a clustered dot dither technique to generate the inventive K separation screen.

The "cluster-dot" dithering array comprises an array of threshold values arranged in small clusters of similar-valued threshold numbers. The clusters or values in such arrays generate patterns of dots in clusters which clusters mimic halftone "dots" and thus produce a processed image with the same characteristics as produced by the traditional halftone screens described above. For example, FIG. 5 schematically illustrates a clustered dot dither array for constructing a K separation dot pattern in accordance with the principles of the present invention. In particular, the array 500 comprises a rectangular array of threshold numbers. In FIG. 5, the numbers are not shown individually, but the array would actually comprise a rectangular grid of discrete numbers. The array corners 502, 504, 506 and 508 delineated by dotted semi-circles indicate array areas consisting of relatively small threshold numbers. In this context "small" means generally less than the average threshold value. Similarly, the circular area 510 at the center of the array 500 would constitute an area of "small" threshold values. The areas of small threshold values are generally indicated by a minus sign (−) to show that they are less than the average threshold value. The remaining array areas comprise threshold numbers which are larger than the average threshold value and are denoted by a plus sign (+).

Since the threshold numbers in the array are compared against the incoming pixel tonal values and a dot is printed only if the tonal value exceeds the threshold value, smaller threshold numbers tend to cause more dots to be printed. When the threshold numbers are clustered, the clusters of printed dots are thus more likely to "grow" a halftone "dot" in that area than in areas of larger threshold numbers. Consequently, in the array 500, halftone "dots" will tend to grow in the corner areas 502–508 and in the center area 510. In actuality, the threshold numbers are arranged so that these halftone "dot" clusters would not be delineated sharply as indicated by the dotted lines but would rather "grade" continuously from the large threshold numbers to the small threshold numbers.

As previously mentioned, a dither array such as that shown in FIG. 5 is effectively tiled across the original image during image processing. This tiling is done by repeatedly using the dither array values to process an incoming stream of image pixels. The effect of this tiling is shown in FIGS. 6A and 6B.

Figure 6A:
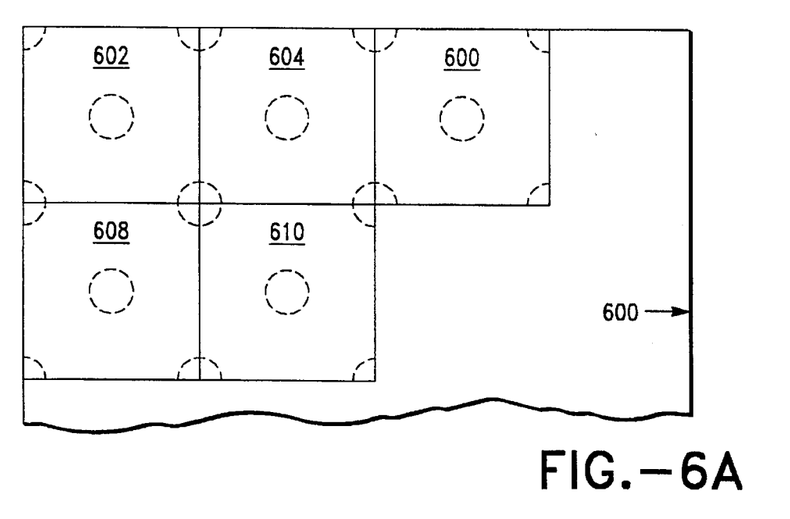
FIG. 6A illustrates the tessellation of an image with the dither array of FIG. 5 for the three primary colors.

In FIG. 6A, the dither array of FIG. 5 is shown tiled across a section of image 600. Although only five dither arrays, 602–610, are shown in FIG. 6A, the entire image would be tiled with dither arrays during the processing of the image pixels. When the dither arrays, such as arrays 602–610, are located adjacent to each other, the circular areas in the corners grow halftone "dots" as shown in FIG. 6A. The dotted areas thus produce a pattern of halftone "dots". In accordance with the invention the pattern of dots generated by the dither array arrangement shown in FIG. 6A could for example be used for the primary color dots including cyan, magenta and yellow and their various combinations.

Figure 6B:
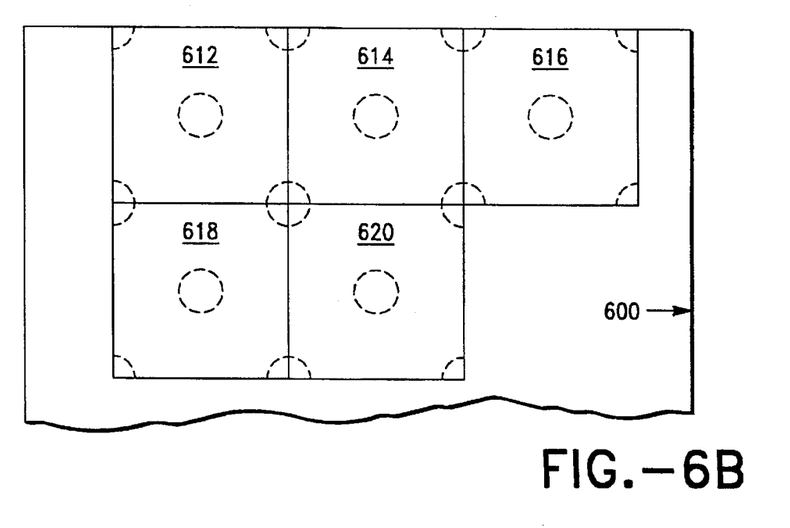
FIG. 6B illustrates the tessellation of an image with the dither array of FIG. 5 for the black color.

FIG. 6B shows a dither array pattern which can be used for the black dots in accordance with the inventive principles. Again, image 600 has been tiled using a set of dither arrays, 612–620. It can be seen that each of dither arrays 612–620 is the same as the dither array shown in FIG. 5. However, dither arrays 612–620 have been offset from dither arrays 602–610 by one half the inverse of the screen frequency. By comparing FIG. 6A to FIG. 6B, it can be seen that the black dots which will be produced by the dither array arrangement in FIG. 6B will be located in the spaces between the colored dots produced by the dither array arrangement of FIG. 6A. When the halftone "dot" patterns produced by FIGS. 6A and 6B are superimposed, the halftone dots are arranged in accordance with the inventive K separation screen pattern such as that shown in FIG. 4.

Figure 7:
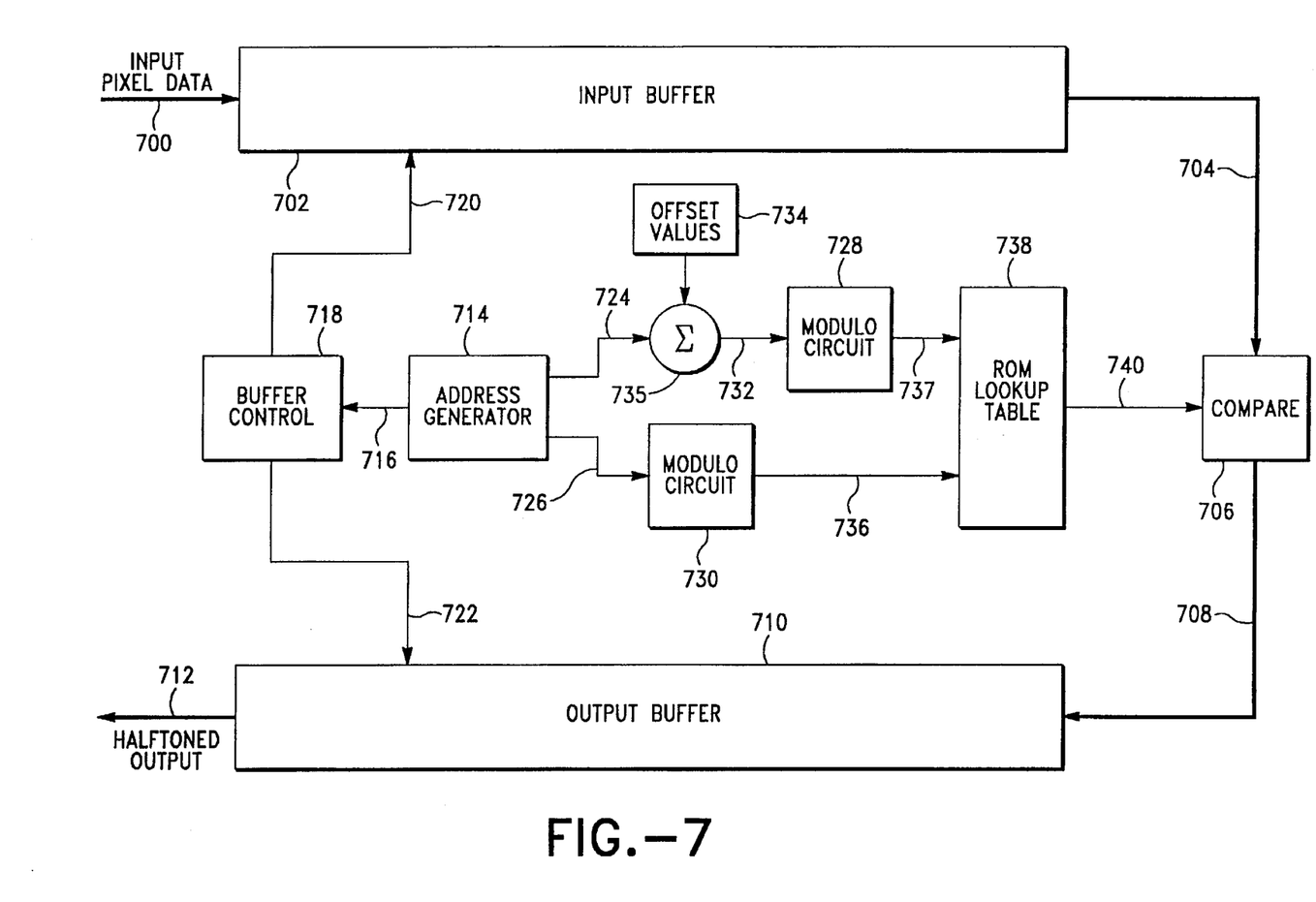
FIG. 7 shows a schematic block diagram of apparatus which can be used with the dither array of FIG. 5 to halftone process image pixels using the inventive K separation screen.

FIG. 7 is a schematic diagram of an illustrative circuit which performs a halftoning operation utilizing the dither array in FIG. 5 to generate an output arranged in accordance with the inventive K separation screen pattern. Input pixel data arrives on bus 700 and is loaded into an input buffer 702. Generally, the input pixel data is generated by a scanner and consists of 24-bit input words, each of which, as previously mentioned, includes three 8 bit words encoding the tonal value of each of the primary colors. The fourth color (black) is generated by a process known as "under-color removal." In this process, the values of the three primary colors are compared and the lowest value is subtracted from all of the primary color values and assigned to the black value.

The four color values are then processed using the halftoning apparatus as shown in FIG. 7. FIG. 7 actually shows an apparatus which would be applied to one of the four color values, however, the apparatus for each of the four values is identical with the exception of the offset circuit 734 which is only used for processing black values as will be hereinafter explained.

In any case, the pixel data, comprising one of the color values is loaded into the input buffer 702 under the control of buffer control circuit 718. Buffer control circuit 718 is a conventional circuit which generates control signals on output line 720 for controlling buffer 702 and buffer control circuit 718 is, in turn, controlled by an address generator 714, via lead 716. Address generator 714 is also a conventional circuit which receives a number of synchronization signals, such as a pixel clocks, a start-of-line (SOL) signal and other signals. In response, address generator 714 generates a number of address signals which are used to coordinate the operation of buffer control 718 and generate addresses for ROM lookup table 738 as will hereinafter be described.

Under control of buffer control circuit 718, pixel color values are shifted out of input buffer 702 and applied, via line 704, to one input of a compare circuit 706. Compare circuit 706 compares the input color value to a dither array threshold value retrieved from ROM lookup table 738 and applied to compare circuit 706 via line 740.

The result of the comparison made by circuit 706 is a single bit that is applied, via compare circuit output 708, to output buffer 710. Output buffer 710 is, in turn, controlled by buffer control circuit 718, via line 722, and temporarily stores the output values. The output 712 of output buffer 710 is the halftone output bits which are provided to the printer.

The threshold values stored in the ROM lookup table 738 correspond to dither array values arranged in a pattern illustrated schematically in FIG. 5. The dither array values are retrieved from ROM 738 by applying appropriate address values to ROM lookup table 738 which address values specify a location in memory 738. The threshold value stored in that memory location is then provided via output 740 to the compare circuit 706.

The address values applied to ROM lookup table 738 are, in turn, generated from the outputs of address generator 714 by modulo circuits 728 and 730 and offset circuit 734 (used during the processing of the black pixels only). More particularly, the address values provided to ROM 738 comprise pixel addresses on line 737 which identify the threshold values for each pixel in a given line of the dither array and a line offset value on line 736 which identifies a line in the dither array. Thus, a combination of a pixel address and a line offset uniquely identifies a particular threshold value in a particular line in the dither array.

The pixel addresses on line 737 are generated by modulo circuit 728 which, in response to pixel numbers generated by address generator 714, generates a repeating set of address numbers on output line 732. The total number of address numbers is equal to the total number of threshold numbers on a given line of the dither array. Thus, as the input values stored in input buffer 702 are shifted out, the repeating set of addresses generated by modulo circuit 728 repeatedly applies the same set of threshold numbers to compare circuit 740. The pixel numbers generated by address generator 714 are applied to modulo circuit 728 via summing circuit 735. However, in the case of primary color pixels, summing circuit 735 merely passes the pixel numbers directly to modulo circuit 728.

The line offset of the ROM the address is applied to ROM lookup table 738, via line 736, by modulo circuit 730. Modulo circuit 730 also generates a repeating output which repeats with a frequency equal to the number of rows in the dither array. Modulo circuit 730 is driven, in turn, by a start-of-line signal (SOL) from address generator 714, provided via lead 726. Address generator 714 applies the SOL signal to line 726 at the start of each scan line. Thus, the line offset applied to ROM lookup table 738 will increase with each scan line of input pixel values until the number of rows in the dither array has been processed at which point, the threshold values in the dither array will be reused. This reusing effectively causes the dither array threshold values to be "tiled" over the image values.

In accordance with the invention, when the black input values are being processed using the arrangement shown in FIG. 7, an offset value generated by offset circuit 734 is added to the pixel numbers generated by address generator 714 by means of summing circuit 735. The added offset causes different threshold values in stored in the ROM 738 to be used during processing. The effect is that the entire array appears to be shifted as shown in FIG. 6B. The shift causes the black dots to be generated out of phase with the primary color dots producing the desired K separation pattern.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A K separation screen for printing halftone images comprised of three primary colors and black on a print medium, the screen comprising:

a square grid comprised of a first plurality of parallel lines spaced a first distance apart and extending in a screen direction and a second plurality of parallel lines spaced the first distance apart and extending in a second direction perpendicular to the screen direction, the first plurality of lines crossing the second plurality of lines to form a plurality of intersections;

a plurality of halftone dot printing positions, each of the plurality of printing positions being arranged at one of the plurality of intersections, each of the plurality of printing positions being divided into one of a first printing position type and a second printing position type wherein the first printing position type alternates in both the screen direction and the second direction with the second printing position type;

printed halftone dots on the print medium comprised of at least one primary color and white located at ones of the plurality of printing positions having the first printing position type; and printed halftone dots on the print medium comprised of black and white located at ones of the plurality of printing positions having the second printing position type.

2. A K separation screen according to claim 1 wherein some of the printed halftone dots located at ones of the plurality of printing positions having the first printing position type are comprised of a plurality of primary colors.

3. A K separation screen according to claim 1 wherein printing positions having a first printing position type are physically offset from printing position having a second printing position type by one-half the screen frequency.

4. A K separation screen according to claim 1 wherein the screen angle of each of the primary colors is 45°.

5. A K separation screen according to claim 1 wherein the screen angle of black is 45°.

6. Apparatus for printing halftone images comprised of three primary input color values and black values, the apparatus comprising:

first means for generating a plurality of halftone dot printing positions of a first type, each of the plurality of printing positions of the first type being arranged at one of a plurality of intersections on a square grid comprised of a first plurality of parallel lines spaced a first distance apart and extending in a screen direction and a second plurality of parallel lines spaced the first distance apart and extending in a second direction perpendicular to the screen direction, the first plurality of lines crossing the second plurality of lines to form the intersections;

second means for generating a plurality of halftone dot printing positions of a second type, each of the plurality of printing positions of the second type being arranged at one of the plurality of intersections, wherein the first printing position type alternates in both the screen direction and the second direction with the second printing position type;

means for printing halftone dots comprised of at least one primary color and white at ones of the plurality of printing positions having the first printing position type; and means for printing halftone dots comprised of black and white located at ones of the plurality of printing positions having the second printing position type.

7. Apparatus for printing halftone images according to claim 6 wherein the first generating means comprises:

means for generating a first clustered dot dither array pattern of threshold values; and means responsive to threshold values in the first dither array pattern and to the three primary color values for generating an output printed dot at the first printing position.

8. Apparatus for printing halftone images according to claim 7 wherein the second generating means comprises:

means for generating a second clustered dot dither array pattern of threshold values;

means responsive to the black values for physically offsetting the second dither array pattern relative to the first dither array pattern; and means responsive to threshold values in the second dither array pattern and to the black values for generating an output printed dot at the second printing position.

9. Apparatus for printing halftone images according to claim 8 wherein the first dither array pattern is identical to the second dither array pattern.

10. Apparatus for printing halftone images according to claim 8 wherein the first dither array pattern comprises a plurality of identical dither arrays arranged in a rectangular grid pattern.

11. Apparatus for printing halftone images according to claim 8 wherein the second dither array pattern comprises a plurality of identical dither arrays arranged in a rectangular grid pattern.

12. Apparatus for printing halftone images according to claim 8 wherein the first generating means comprises:

a read-only memory for storing the threshold values;

a first address generator responsive to the three primary color values for generating first addresses; and first means responsive to the first addresses for retrieving the threshold values from the read-only memory.

13. Apparatus for printing halftone images according to claim 8 wherein the second generating means comprises:

a second address generator responsive to the black values for generating second addresses; and second means responsive to the second addresses for retrieving the threshold values from the read-only memory.

14. Apparatus for printing halftone images according to claim 13 wherein the offsetting means comprises means for adding an offset value to the second addresses.

15. Apparatus for printing halftone images comprised of three primary input color values and black values, the apparatus comprising:

a read-only memory for storing a plurality of threshold values comprising a dither array pattern;

a first address generator responsive to the three primary color values for generating first addresses;

first means responsive to the first addresses for retrieving the threshold values from the read-only memory;

a second address generator responsive to the black color values for generating second addresses;

second means responsive to the second addresses for retrieving the threshold values from the read-only memory; and means responsive to the black values for adding a predetermined offset value to the second addresses.

16. Apparatus for printing halftone images according to claim 15 wherein the first address generator means comprises:

an address generator responsive to the three primary color values and to the black values for generating pixel position signals; and a modulo circuit responsive to the pixel position signals for generating a repetitive set of pixel position addresses.

17. A method for printing halftone images comprised of three primary input color values and black values, the method comprising the steps of:

A. generating a plurality of halftone dot printing positions of a first type, each of the plurality of printing positions of the first type being arranged at one of a plurality of intersections on a square grid comprised of a first plurality of parallel lines spaced a first distance apart and extending in a screen direction and a second plurality of parallel lines spaced the first distance apart and extending in a second direction perpendicular to the screen direction, the first plurality of lines crossing the second plurality of lines to form the intersections;

B. generating a plurality of halftone dot printing positions of a second type, each of the plurality of printing positions of the second type being arranged at one of the plurality of intersections, wherein the first printing position type alternates in both the screen direction and the second direction with the second printing position type;

C. printing halftone dots comprised of at least one primary color and white at ones of the plurality of printing positions having the first printing position type; and D. printing halftone dots comprised of black and white located at ones of the plurality of printing positions having the second printing position type.

18. A method for printing halftone images according to claim 17 wherein step A comprises the steps of:

A1. generating a first clustered dot dither array pattern of threshold values; and A2. generating an output printed dot at the first printing position using threshold values in the first dither array pattern and the three primary color values.

19. A method for printing halftone images according to claim 18 wherein step B comprises the steps of:

B1. generating a second clustered dot dither array pattern of threshold values;

B2. physically offsetting the second dither array pattern relative to the first dither array pattern in response to the black values; and B3. generating an output printed dot at the second printing position using the threshold values in the second dither array pattern and the black values.

20. A method for printing halftone images according to claim 19 wherein step B1 comprises the step of:

B1A. generating a second dither array pattern identical to the first dither array pattern.

21. A method for printing halftone images according to claim 19 wherein step A1 comprises the step of:

A1A. arranging a plurality of identical dither arrays in a rectangular grid pattern to generate the first dither array pattern.

22. A method for printing halftone images according to claim 19 wherein step B1 comprises the step of:

B1B. arranging a plurality of identical dither arrays in a rectangular grid pattern to generate the second dither array pattern.

23. A method for printing halftone images according to claim 19 wherein step A1 comprises the steps of:

A1B. storing the threshold values in a read-only memory;

A1C. generating first addresses in response to the three primary color values; and A1D. retrieving the threshold values from the read-only memory in response to the first addresses.

24. A method for printing halftone images according to claim 19 wherein step B1 comprises the steps of:

B1C. generating second addresses in response to the black values; and

B1D. retrieving the threshold values from the read-only memory in response to the second addresses.

25. A method for printing halftone images according to claim 24 wherein step B2 comprises the step of:

B2A. adding an offset value to the second addresses.

\* \* \* \* \*